US012573836B2

(12) United States Patent

Lu et al.

(10) Patent No.: US 12,573,836 B2
(45) Date of Patent: Mar. 10, 2026

(54) APPARATUS AND METHOD FOR PROTECTING SOLID-STATE CIRCUIT BREAKER

(71) Applicant: Schneider Electric (China) Co., Ltd., Beijing (CN)

(72) Inventors: Feng Lu, Beijing (CN); Haijun Zhao, Beijing (CN); Heng Bai, Beijing (CN); Shunxian Mao, Beijing (CN); Jiamin Chen, Beijing (CN); Fenglian Zhang, Beijing (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 73 days.

(21) Appl. No.: 18/583,959

(22) Filed: Feb. 22, 2024

(65) Prior Publication Data

US 2025/0226650 A1 Jul. 10, 2025

(30) Foreign Application Priority Data

Jan. 10, 2024 (CN) .......................... 202410038570.3

(51) Int. Cl.
*H02H 5/04* (2006.01)
*H02H 6/00* (2006.01)
(Continued)

(52) U.S. Cl.
CPC ................ *H02H 5/04* (2013.01); *H02H 6/00* (2013.01); *H02H 6/005* (2013.01); *G01K 1/024* (2013.01); *G01K 3/005* (2013.01); *H02H 7/222* (2013.01)

(58) Field of Classification Search
CPC ..... H02H 6/00; H02H 6/005; H02H 5/04–048
See application file for complete search history.

(56) References Cited

U.S. PATENT DOCUMENTS

| | | | |
|---|---|---|---|
| 2024/0222956 A1* | 7/2024 | Yang | H02H 3/20 |
| 2025/0062608 A1* | 2/2025 | Wang | H02H 3/087 |
| 2025/0069837 A1* | 2/2025 | Kinsel | G01R 31/3275 |

FOREIGN PATENT DOCUMENTS

| | | | | |
|---|---|---|---|---|
| KR | 20220131078 A | 9/2022 | | |
| WO | WO-2023215071 A1 * | 11/2023 | | H02H 3/33 |

OTHER PUBLICATIONS

Translation of KR 20220131078A. Sep. 27, 2022. (Year: 2022).*
(Continued)

*Primary Examiner* — Thienvu V Tran
*Assistant Examiner* — Christopher J Clark
(74) *Attorney, Agent, or Firm* — Wolf, Greenfield & Sacks, P.C.

(57) ABSTRACT

According to embodiments of the present disclosure, there is provided an apparatus and method for protecting a solid-state circuit breaker. The apparatus comprises: a temperature detection unit configured to detect a case temperature of each transient voltage suppressor in one or more transient voltage suppressors; and a control unit configured to: receive the case temperature of one or more transient voltage suppressors from the temperature detection unit; for each of the one or more transient voltage suppressors, predict a junction temperature of each of the one or more transient voltage suppressors after the first switching device and the second switching device are switched from an on state to an off state, based on the case temperature before the first switching device and the second switching device are switched from the on state to the off state; and in response to the junction temperature of at least one transient voltage suppressor of the one or more transient voltage suppressors exceeding a predetermined temperature threshold, generate a first alarm signal.

14 Claims, 3 Drawing Sheets

(51) Int. Cl.
    *G01K 1/024*        (2021.01)
    *G01K 3/00*        (2006.01)
    *H02H 7/22*        (2006.01)

(56)                         References Cited

OTHER PUBLICATIONS

Extended European Search Report (EESR) dated Sep. 5, 2024 for corresponding European Patent Application No. 24159260.9-1002, 22 pages.
On Semiconductor: "TVS/Zener Theory and Design Considerations Handbook", Jun. 1, 2005, Retrieved from the Internet, URL: <https://web.archive.org/web/20150708062839if_/http://www.onsemi.com/pub_link/Collateral/HBD854-D.PDF> [retrieved on Jan. 28, 2022], pp. 1-127.
Ahmed, M.M.R. et al., "Predicting IGBT Junction Temperature Under Transient Condition," Industrial Electronics, 2002, ISIE 2002, Proceedings of the 2002 IEEE International Symposium on Jul. 8-11, 2002, vol. 3, Jul. 8, 2002, pp. 874-877.

\* cited by examiner

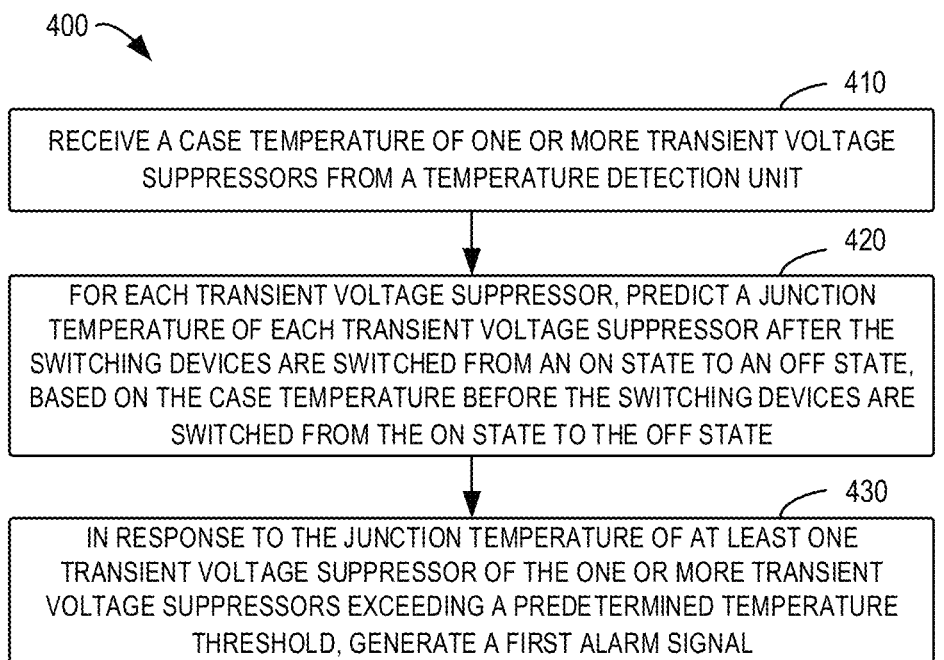

400

410

RECEIVE A CASE TEMPERATURE OF ONE OR MORE TRANSIENT VOLTAGE SUPPRESSORS FROM A TEMPERATURE DETECTION UNIT

420

FOR EACH TRANSIENT VOLTAGE SUPPRESSOR, PREDICT A JUNCTION TEMPERATURE OF EACH TRANSIENT VOLTAGE SUPPRESSOR AFTER THE SWITCHING DEVICES ARE SWITCHED FROM AN ON STATE TO AN OFF STATE, BASED ON THE CASE TEMPERATURE BEFORE THE SWITCHING DEVICES ARE SWITCHED FROM THE ON STATE TO THE OFF STATE

430

IN RESPONSE TO THE JUNCTION TEMPERATURE OF AT LEAST ONE TRANSIENT VOLTAGE SUPPRESSOR OF THE ONE OR MORE TRANSIENT VOLTAGE SUPPRESSORS EXCEEDING A PREDETERMINED TEMPERATURE THRESHOLD, GENERATE A FIRST ALARM SIGNAL

FIG. 4

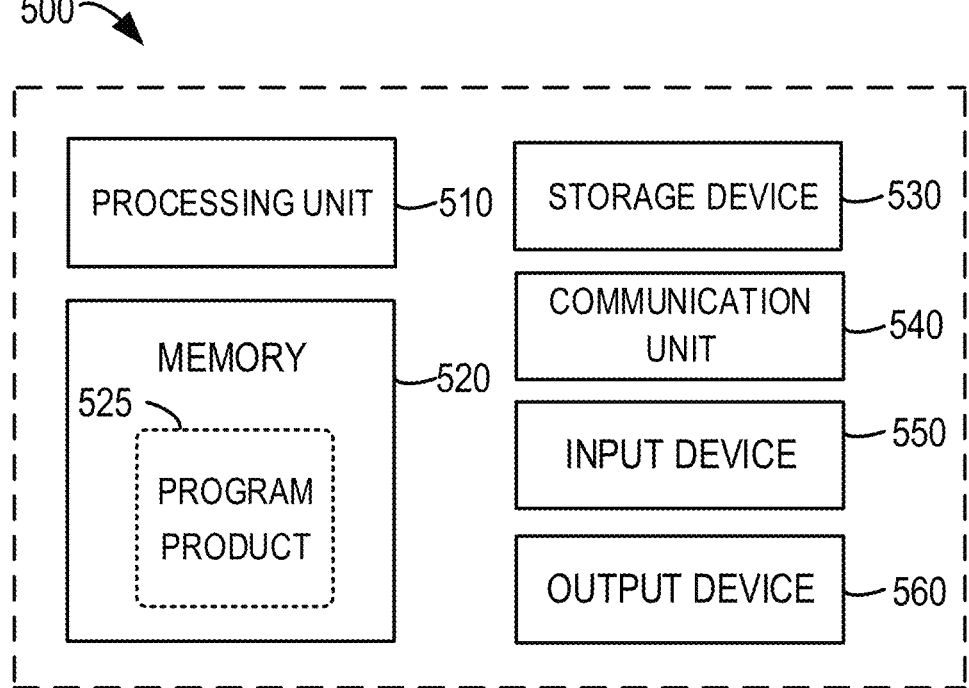

500

PROCESSING UNIT ─510

STORAGE DEVICE ─530

MEMORY ─520

525

PROGRAM PRODUCT

COMMUNICATION UNIT ─540

INPUT DEVICE ─550

OUTPUT DEVICE ─560

FIG. 5

APPARATUS AND METHOD FOR PROTECTING SOLID-STATE CIRCUIT BREAKER

CROSS-REFERENCE TO RELATED APPLICATION

The present application claims priority to Chinese Patent Application No. 202410038570.3, filed on Jan. 10, 2024, which is incorporated herein by reference in its entirety.

FIELD

Example embodiments of the present disclosure generally relate to the field of electrical equipment, and more particularly to an apparatus and method for protecting a solid-state circuit breaker, a solid-state circuit breaker, and a computer-readable storage medium.

BACKGROUND

A circuit breaker is a switching device that is responsible for switching on and off a current in a normal circuit state and capable of closing and carrying a current in an abnormal circuit state within a specified time. A solid-state circuit breaker is a future development trend of end power distribution equipment, which realizes on-off control of a main circuit through contactless switching devices. In the solid-state circuit breaker, a transient voltage suppressor (TVS) is the most direct and effective means to protect solid-state switching devices from being broken down by a voltage generated by a line inductance. With continuous increase of a current level in the solid-state circuit breaker and the line inductance in practical application situation, an induced voltage generated by the line inductance and beared by the solid-state circuit breaker is increasing, which brings a great challenge to the life of protection devices such as the transient voltage suppressor. In addition, overcurrent phenomena such as lightning strikes may also occur in practical application scenarios, which will also pose challenges to the life and stability of the transient voltage suppressor.

SUMMARY

Embodiments of the present disclosure provides an apparatus and method for protecting a solid-state circuit breaker, a solid-state circuit breaker, and a computer-readable storage medium, at least in part to the foregoing and other potential problems present in the prior art.

In a first aspect of the present disclosure, there is provided an apparatus for protecting a solid-state circuit breaker. The solid-state circuit breaker comprises a first switching device, a second switching device, and a first transient voltage suppression unit, the first switching device is connected in series with the second switching device, both the first switching device and the second switching device are connected in parallel with the first transient voltage suppression unit, the first transient voltage suppression unit comprises one or more transient voltage suppressors. The apparatus comprises: a temperature detection unit configured to detect a case temperature of each of the one or more transient voltage suppressors; and a control unit configured to: receive the case temperature of the one or more transient voltage suppressors from the temperature detection unit; for each of the one or more transient voltage suppressors, predict a junction temperature of each of the one or more transient voltage suppressors after the first switching device and the second switching device are switched from an on state to an off state, based on the case temperature before the first switching device and the second switching device are switched from the on state to the off state; and in response to the junction temperature of at least one transient voltage suppressor of the one or more transient voltage suppressors exceeding a predetermined temperature threshold, generate a first alarm signal.

In a second aspect of the present disclosure, there is provided a method for protecting a solid-state circuit breaker. The solid-state circuit breaker comprises a first switching device, a second switching device, and a first transient voltage suppression unit, the first switching device is connected in series with the second switching device, both the first switching device and the second switching device are connected in parallel with the first transient voltage suppression unit, the first transient voltage suppression unit comprises one or more transient voltage suppressors. The method comprises: receiving a case temperature of the one or more transient voltage suppressors from a temperature detection unit configured to detect the case temperature of each of the one or more transient voltage suppressors; for each of the one or more transient voltage suppressors, predict a junction temperature of each of the one or more transient voltage suppressors after the first switching device and the second switching device are switched from an on state to an off state, based on the case temperature before the first switching device and the second switching device are switched from the on state to the off state; and in response to the junction temperature of at least one transient voltage suppressor of the one or more transient voltage suppressors exceeding a predetermined temperature threshold, generate a first alarm signal.

In a third aspect of the present disclosure, there is provided a solid-state circuit breaker, comprising an apparatus of the first aspect of the present disclosure.

In a fourth aspect of the present disclosure, there is provided a computer-readable storage medium having a computer program stored thereon, the computer program being executable by a processor to implement a method of the second aspect of the present disclosure.

According to the embodiments of the present disclosure, it is able to diagnose working state of the transient voltage suppressors in the solid-state circuit breaker. In a case that it is necessary to turn off the switching device, a junction temperature of the transient voltage suppressor after the switching device is switched off can be predicted in advance based on a surface temperature of the transient voltage suppressor, and an alarm can be issued when the junction temperature exceeds a predetermined temperature threshold. In this way, potential safety hazards of the transient voltage suppressors can be found in a timely manner to ensure safe and reliable operation of the solid-state circuit breaker.

It should be understood that the content described in this section is not intended to limit critical or important features of the embodiments of the present disclosure, nor is it used to limit the scope of the present disclosure. Other features of the present disclosure will become easier to be understood through the following description.

BRIEF DESCRIPTION OF THE DRAWINGS

The above and other features, advantages, and aspects of each embodiment of the present disclosure will become more apparent in conjunction with the accompanying drawings and with reference to the following detailed explanations. In the accompanying drawings, the same or similar reference symbols represent the same or similar elements, where:

FIG. 4 shows a flowchart of a process for protecting a solid-state circuit breaker according to some embodiments of the present disclosure; and FIG. 5 shows a block diagram of a device capable of implementing a plurality of embodiments of the present disclosure.

DETAILED DESCRIPTION

Figure 1:
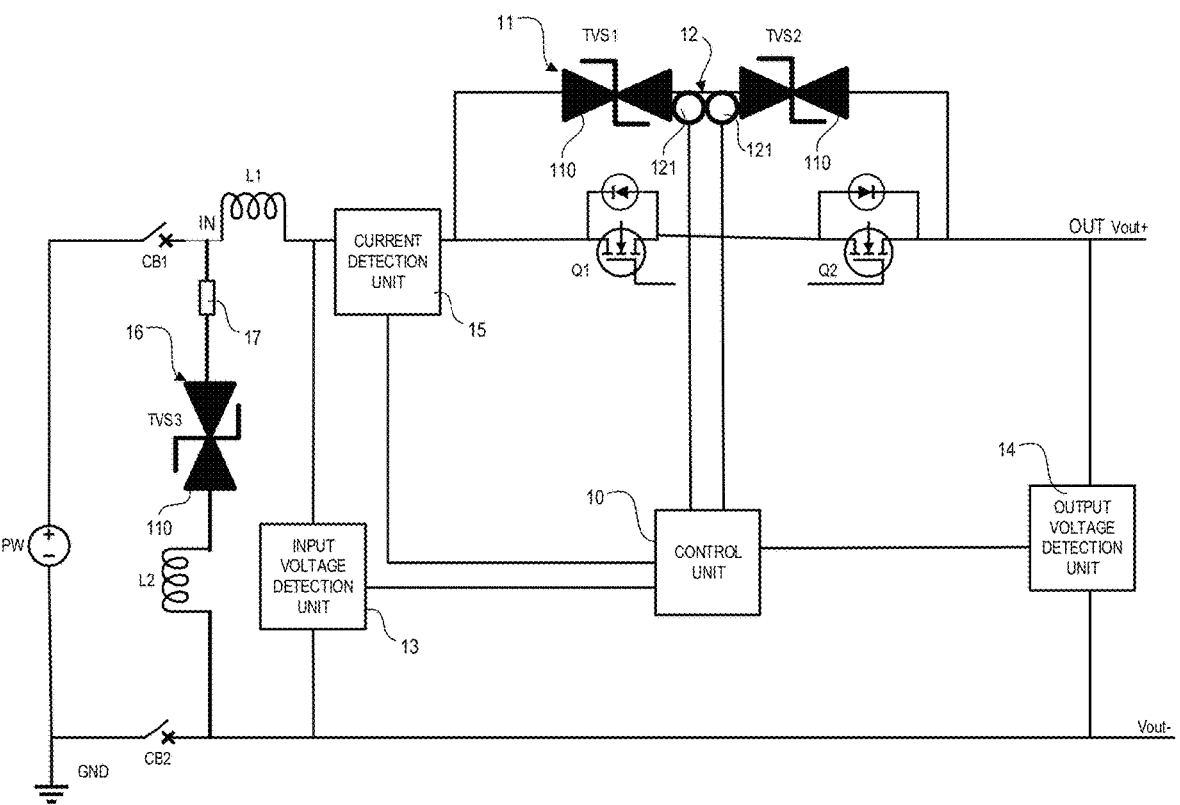
FIG. 1 shows a circuit schematic view of a solid-state circuit breaker of some embodiments of the present disclosure.

Embodiments of the present disclosure will be described in more detail with reference to the accompanying drawings. Although certain embodiments of the present disclosure are shown in the drawings, it should be understood that the present disclosure can be implemented in various forms and should not be construed as limited to the embodiments set forth herein. On the contrary, these embodiments are provided for a more thorough and complete understanding of the present disclosure. It should be understood that the accompanying drawings and embodiments of the present disclosure are for illustrative purposes only and are not intended to limit the scope of protection of the present disclosure.

In the description of embodiments of the present disclosure, the term "including" and similar terms should be understood as open-ended inclusion, that is, "including but not limited to". The term "based on" should be understood as "at least partially based on". The term "one embodiment" or "the embodiment" should be understood as "at least one embodiment". The term "some embodiments" should be understood as "at least some embodiments". The following text may also include other explicit and implicit definitions. The terms "first", "second", etc. may refer to different or identical objects. The following text may also include other explicit and implicit definitions.

As mentioned above, with continuous increase of a current level in the solid-state circuit breaker and the line inductance in practical application situation, an induced voltage generated by the line inductance and beared by the solid-state circuit breaker is increasing, which brings a great challenge to the life of protection devices such as the transient voltage suppressor. In addition, overcurrent phenomena such as lightning strikes may also occur in practical application scenarios, which will also pose challenges to the life and stability of the transient voltage suppressor. Embodiments of the present disclosure provide a scheme for protecting the solid-state circuit breaker, which can diagnose a working state of the transient voltage suppressor in the solid-state circuit breaker; in a case that it is necessary to turn off the switching device, a junction temperature of the transient voltage suppressor after the switching device is switched off can be predicted in advance based on a surface temperature of the transient voltage suppressor, and an alarm can be issued when the junction temperature exceeds a predetermined temperature threshold. The principle of the present disclosure will be described below in conjunction with FIGS. 1 to 5.

FIG. 1 shows a circuit schematic view of a solid-state circuit breaker of some embodiments of the present disclosure. FIG. 1 shows setting the solid-state circuit breaker only in a single-phase circuit of a main circuit as an example to describe principles of the present disclosure. It should be understood that in the embodiments of the present disclosure, the solid-state circuit breaker can be set individually for each phase circuit, or in a part of multiple phase circuits, and these implementations fall within the scope of the present disclosure.

FIG. 1 shows an L-phase line and an N-phase line. The L-phase line is connected to a positive pole of a power supply PW, and the N-phase line is connected to a negative pole of the power supply PW and to ground GND. An isolation switch CB1 is provided in the L-phase line, and an isolation switch CB2 is provided in the N-phase line.

As shown in FIG. 1, the solid-state circuit breaker described here includes an input terminal IN and an output terminal OUT. The input terminal IN is connected to the isolation switch CB1, and the output terminal OUT is adapted to provide an output voltage Vout to a subsequent circuit.

As shown in FIG. 1, the solid-state circuit breaker further includes a first switching device Q1 and a second switching device Q2 connected in series between the input terminal IN and the output terminal OUT. The first switching device Q1 and the second switching device Q2 are respectively formed with a freewheeling diode. The first switching device Q1 and the second switching device Q2 are main circuit solid-state switches adapted to control an on-off state of the main circuit. The first switching device Q1 and the second switching device Q2 may include various conventional or future available types. In an embodiment, the first switching device Q1 and the second switching device Q2 may include metal oxide field effect transistors (MOSFETs), such as SiC MOSFETs. In another embodiment, the first switching device Q1 and the second switching device Q2 may include insulated gate field effect transistors (IGBTs).

As shown in FIG. 1, the solid-state circuit breaker further includes a first transient voltage suppression unit 11 connected in parallel with the first switching device Q1 and the second switching device Q2. The first transient voltage suppression unit 11 may include one or more transient voltage suppressors 110. In a case that the first switching device Q1 and the second switching device Q2 are switched from an on state to an off state, the line inductance can generate an induced voltage. In a case that the induced voltage reaches a certain voltage level, the transient voltage suppressor 110 in the first transient voltage suppression unit 11 can be broken down, so that the first transient voltage suppression unit 11 is switched on to prevent the first switching device Q1 and the second switching device Q2 from being broken down. In a case that the transient voltage suppressor 110 in the first transient voltage suppression unit 11 is switched on, a high current will be generated in the transient voltage suppressor 110. Under the action of the high voltage and high current, a temperature of the transient voltage suppressor 110 in the first transient voltage suppression unit 11 will rise instantaneously.

In an embodiment, as shown in FIG. 1, the first transient voltage suppression unit 11 includes two transient voltage suppressors 110, namely TVS1 and TVS2. It should be understood that the first transient voltage suppression unit 11 may include more or fewer transient voltage suppressors 110 depending on the voltage level of the induced voltage generated by the line inductance in a case that the first switching device Q1 and the second switching device Q2 are switched off. For example, when the voltage of the induced voltage generated by the line inductance is low in a case that the first switching device Q1 and the second switching device Q2 are switched off, the first transient voltage suppression unit 11 may include only a single transient voltage suppressor 110. When the voltage of the induced voltage generated by the line inductance is high in a case that the first switching device Q1 and the second switching device Q2 are switched off, the first transient voltage suppression unit 11 may include three or more transient voltage suppressors 110.

As shown in FIG. 1, the solid-state circuit breaker described herein includes an apparatus for protecting the solid-state circuit breaker. The apparatus can diagnose a working state of the transient voltage suppressor 110 in the solid-state circuit breaker, timely find potential safety hazards of the transient voltage suppressor 110, and ensure the safe and reliable operation of the solid-state circuit breaker. For convenience of description, the apparatus for protecting the solid-state circuit breaker can described herein also be referred to as a protection apparatus.

In some embodiments, as shown in FIG. 1, the protection apparatus includes a temperature detection unit 12 and a control unit 10. The temperature detection unit 12 is adapted to detect a case temperature of each transient voltage suppressor 110 in the first transient voltage suppression unit 11. The control unit 10 is adapted to diagnose the operating state of each transient voltage suppressor 110 based on the case temperature detected by the temperature detection unit 12.

In some embodiments, as shown in FIG. 1, the temperature detection unit 12 includes one or more temperature sensors 121, for detecting the case temperature of the corresponding transient voltage suppressor 110, respectively. For example, in a case that the first transient voltage suppression unit 11 includes two transient voltage suppressors 110, the temperature detection unit 12 may include two temperature sensors 121, each detecting the case temperature of the corresponding transient voltage suppressor 110. In a case that the first transient voltage suppression unit 11 includes more or fewer transient voltage suppressors 110, the temperature detection unit 12 may include more or fewer temperature sensors 121, for detecting the case temperature of the corresponding transient voltage suppressor 110, respectively.

Figure 2:
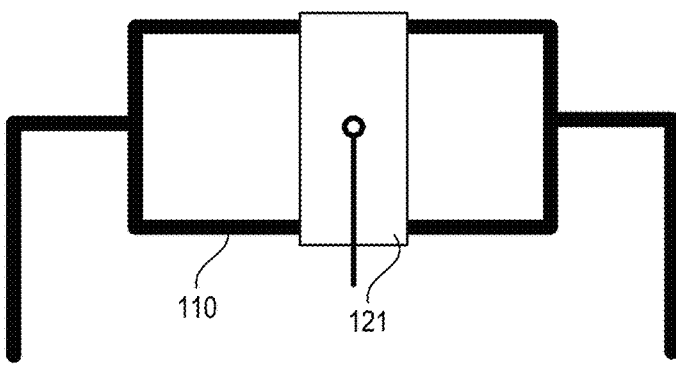
FIG. 2 shows an example arrangement of a temperature sensor on a transient voltage suppressor according to some embodiments of the present disclosure.

FIG. 2 shows an example arrangement of a temperature sensor 121 on a transient voltage suppressor 110 according to some embodiments of the present disclosure. As shown in FIG. 2, the temperature sensor 121 is fixed onto a case surface of the corresponding transient voltage suppressor 110 for detecting the case temperature of the corresponding transient voltage suppressor 110. In some embodiments, the temperature sensor 121 can be fixed onto the case surface of the corresponding transient voltage suppressor 110 by plastic embedment. In some embodiments, the temperature sensor 121 can be fixed onto the case surface of the corresponding transient voltage suppressor 110 by a metal foil. In some embodiments, the temperature sensor 121 can be fixed onto the case surface of the corresponding transient voltage suppressor 110 by a heat-resistant adhesive. In some embodiments, the temperature sensor 121 can be fixed onto the case surface of the corresponding transient voltage suppressor 110 by a combination of the above fixing methods. It should be understood that, in other embodiments, the temperature sensor 121 may be fixed onto the case surface of the corresponding transient voltage suppressor 110 by any other suitable means, these implementations fall within the scope of the present disclosure.

As shown in FIG. 1, the temperature detection unit 12 is electrically connected to the control unit 10. The temperature detection unit 12 may be connected to the control unit 10 by a wired or wireless manner, embodiments of the present disclosure are not limited thereto.

The control unit 10 may receive the case temperature of each transient voltage suppressor 110 from the temperature detection unit 12. Then, for each transient voltage suppressor 110, the control unit 10 may predict the junction temperature of each transient voltage suppressor 110 after the first switching device Q1 and the second switching device Q2 are switched from the on state to the off state based on the case temperature before the first switching device Q1 and the second switching device Q2 are switched from the on state to the off state. The control unit 10 can diagnose the working state of each transient voltage suppressor 110 based on the predicted junction temperature of each transient voltage suppressor 110. The control unit 10 can generate a first alarm signal in response to the junction temperature of at least one transient voltage suppressor 110 among the one or more transient voltage suppressors 110 exceeding a predetermined temperature threshold. The first alarm signal can alert an operator in any appropriate means. For example, the first alarm signal can alert the operator by at least one of sound and flash. In embodiments of the present disclosure, the predetermined temperature threshold may be preset and stored in the control unit 10 according to design requirements.

In some embodiments, the control unit 10 may record a case temperature rise of each transient voltage suppressor 110 in the first transient voltage suppression unit 11 each time the first switching device Q1 and the second switching device Q2 are switched off normally according to the actual installation situation. For each transient voltage suppressor 110, the control unit 10 may calculate an average value of multiple temperature rise records as a reference case temperature rise of each transient voltage suppressor 110 when the first switching device Q1 and the second switching device Q2 are switched off for one time. Based on the obtained reference case temperature rise, the control unit 10 may automatically determine the change in the junction temperature of each transient voltage suppressor 110 caused by the switching-off process before switching off the first switching device Q1 and the second switching device Q2 each time. In a case that the determined junction temperature exceeds the predetermined temperature threshold, an alarm may be automatically triggered before switching off the first switching device Q1 and the second switching device Q2 to alert the operator that there may be a safety hazard in the transient voltage suppressor 110.

In some embodiments, the junction temperature of each transient voltage suppressor 110 may be determined by a following equation:

$$Tj=Tcase+delta\_Tcase*K+Terr,$$

where Tj represents the junction temperature of each transient voltage suppressor 110 predicted before the first switching device Q1 and the second switching device Q2 are switched from the on state to the off state, Tcase represents the case temperature of each transient voltage suppressor 110 before the first switching device Q1 and the second switching device Q2 are switched from the on state to the off state, delta_Tcase represents the average value of the temperature rise of the case temperature of each transient voltage suppressor 110 in a case that the first switching device Q1 and the second switching device Q2 are switched off normally for multiple times (i.e., the reference case temperature rise mentioned above), K represents a conversion coefficient, and Terr is a predetermined temperature conversion error. Terr can be set according to design requirements, for example, 10° C.

It should be noted that the numbers, values, etc. mentioned above and elsewhere in the present disclosure are exemplary and are not intended to limit the scope of the present disclosure in any way. Any other suitable numbers or values are possible.

In some embodiments, the control unit 10 may also record the number of times that an instantaneous temperature rise occurs in the case temperature, and in response to the number of times of the instantaneous temperature rise reaching a predetermined number of times, generate a second alarm signal. The number of times of the instantaneous temperature rise represents the number of times that the transient voltage suppressor 110 in the first transient voltage suppression unit 11 can withstand surges, that is, the number of times that the first switching device Q1 and the second switching device Q2 are switched off. The thickness of the PN junction (semiconductor-metal sheet) inside the transient voltage suppressor 110 in the first transient voltage suppression unit 11 is inversely proportional to the number of times of an avalanche breakdown. The thickness of the PN junction inside the transient voltage suppressor 110 becomes thinner each time a breakdown occurs. Therefore, a predetermined number of times can be pre-set and stored in the control unit 10. When the number of times of the instantaneous temperature rise is lower than the predetermined number of times, it indicates that the transient voltage suppressor 110 in the first transient voltage suppression unit 11 can operate reliably. When the number of times of the instantaneous temperature rise reaches the predetermined number, it indicates that the transient voltage suppressor 110 in the first transient voltage suppression unit 11 may pose a safety risk, so the control unit 10 can generate a second alarm signal to prompt the operator. In this way, the control unit 10 can ensure that the number of times of instantaneous temperature rise of the transient voltage suppressor 110 in the first transient voltage suppression unit 11 is within a specification requirement by recording the number of times of instantaneous temperature rise of the transient voltage suppressor 110 in the first transient voltage suppression unit 11. The second alarm signal can alert the operator in any suitable way. For example, the second alarm signal can alert the operator through at least one of sound and flash. In embodiments of the present disclosure, the predetermined number of times can be set according to product design requirements, such as 10,000 times, 30,000 times, 100,000 times, or other values.

In some implementations, as shown in FIG. 1, the protection apparatus further includes a current detection unit 15, an input voltage detection unit 13, and an output voltage detection unit 14 connected to the control unit 10. The current detection unit 15 is adapted to detect a current of the first transient voltage suppression unit 11. The input voltage detection unit 13 is adapted to detect the input voltage of the first transient voltage suppression unit 11. the output voltage detection unit 14 is adapted to detect an output voltage of the first transient voltage suppression unit 11. The control unit 10 can determine the voltage across the first transient voltage suppression unit 11 based on the input voltage and the output voltage, and determine whether the first transient voltage suppression unit 11 operates in a normal state based on the current of the first transient voltage suppression unit 11 and the voltage across the first transient voltage suppression unit 11. In response to the first transient voltage suppression unit 11 not operating in the normal state, the control unit 10 can generate a third alarm signal. The third alarm signal can alert the operator in any suitable way. For example, the third alarm signal can alert the operator by at least one of sound and flash.

Figure 3A:
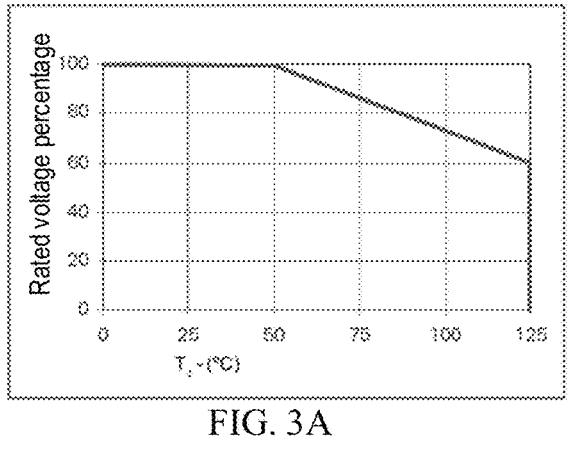
FIGS. 3A to 3D illustrate nominal parameters of a transient voltage suppressor according to some embodiments of the present disclosure.
Figure 3B:
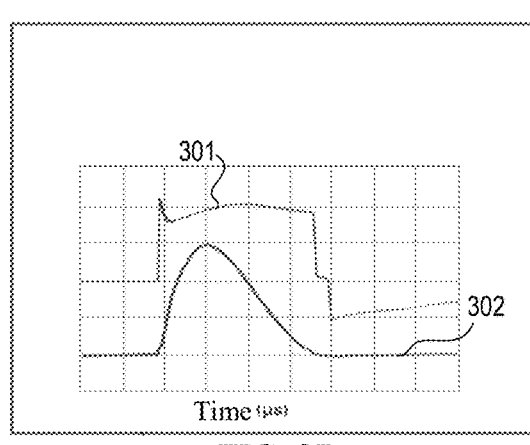
Figure 3C:
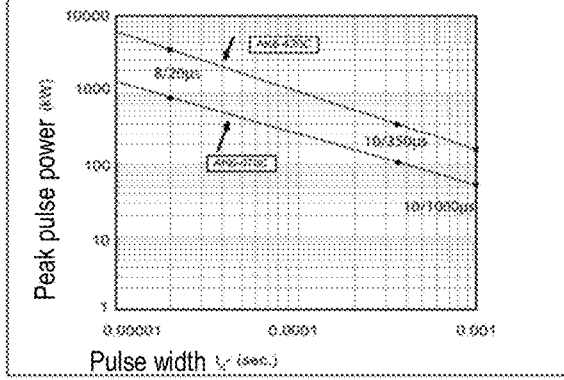
Figure 3D:
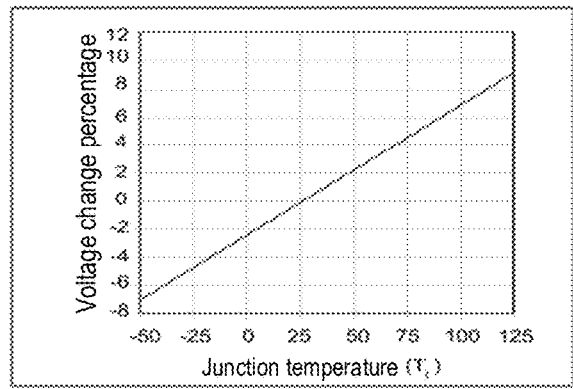

In some embodiments, a safe operation area curve, a temperature derating curve, a maximum single pulse power, and a maximum clamping voltage of each transient voltage suppressor 110 in the first transient voltage suppression unit 11 can be stored in the control unit 10 in advance. FIGS. 3A to 3D show some rated parameters of the transient voltage suppressor 110 according to some embodiments of the present disclosure. As shown in FIG. 3A, the rated voltage of the transient voltage suppressor 110 changes with the junction temperature. In a case that the junction temperature exceeds 50° C., the rated voltage of the transient voltage suppressor 110 will gradually decrease. As shown in FIG. 3B, curve 301 shows the voltage change of the transient voltage suppressor 110 in the first transient voltage suppression unit 11 upon experiencing surge, and curve 302 shows the current change of the transient voltage suppressor 110 upon experiencing surge. As shown in FIG. 3C, the maximum single pulse power of the transient voltage suppressor 110 changes with pulse width. As shown in FIG. 3D, the breakdown voltage of the transient voltage suppressor 110 changes with the junction temperature.

In some embodiments, the control unit 10 may determine whether the first transient voltage suppression unit 11 operates in the normal state. The control unit 10 may determine whether each transient voltage suppressor 110 in the first transient voltage suppression unit 11 touches at least one of the safe operation area curve, the temperature derating curve, the maximum single pulse power, and the maximum clamping voltage. In response to the first transient voltage suppression unit 11 not touching at least one of the safe operation area curve, the temperature derating curve, the maximum single pulse power and the maximum clamping voltage, the control unit 10 may determine that the first transient voltage suppression unit 11 operates in the normal state. In response to the first transient voltage suppression unit 11 touching at least one of the safe operation area curve, the temperature derating curve, the maximum single pulse power and the maximum clamping voltage, the control unit 10 may determine that the first transient voltage suppression unit 11 has already operated in a limit state, that is, not in the normal state. In a case that the first transient voltage suppression unit 11 has already operated in the limit state, the control unit 10 may generate a third alarm signal to indicate potential risks.

The transient voltage suppressor 110 in the first transient voltage suppression unit 11 cannot withstand an overvoltage for a long time. For example, the longest time that the transient voltage suppressor 110 can withstand the overvoltage may be 10 ms or less. Therefore, when the overvoltage occurs in the solid-state circuit breaker, it is necessary to quickly trip the mechanical switch within 10 ms to protect the transient voltage suppressor 110 and the switching devices Q1 and Q2 of the subsequent stage from damage. To this end, in some embodiments, the protection apparatus further includes a fuse 17 and a second transient voltage suppression unit 16, as shown in FIG. 1.

As shown in FIG. 1, the fuse 17 and the second transient voltage suppression unit 16 are connected in series with the electromagnetic coil L2 for tripping the mechanical switch.

The fuse 17 is adapted to protect the second transient voltage suppression unit 16 from being burned out by long-term overcurrent. The second transient voltage suppression unit 16 may include one or more transient voltage suppressors 110. In a case that a voltage across the second transient voltage suppression unit 16 exceeds a first predetermined voltage threshold, the transient voltage suppressor 110 in the second transient voltage suppression unit 16 can be switched on. In a case that the voltage across the second transient voltage suppression unit 16 exceeds the second predetermined voltage threshold (for example, overvoltage occurs), the transient voltage suppressor 110 in the second transient voltage suppression unit 16 can be switched on and the electromagnetic coil L2 can trip the mechanical switch. The second predetermined voltage threshold is higher than the first predetermined voltage threshold.

In a case that a system voltage exceeds a breakdown voltage of the second transient voltage suppression unit 16 (i.e., the first predetermined voltage threshold, such as 860V), the second transient voltage suppression unit 16 will be gradually switched on, so that the current flowing through the second transient voltage suppression unit 16 increases gradually. The electromagnetic coil L2 has a fixed resistance value R (e.g., 8.6 ohm), which is adapted to limit the maximum current flowing through the second transient voltage suppression unit 16, such as 100 A. In the case of overvoltage (exceeding the second predetermined voltage threshold), the current flowing through the second transient voltage suppression unit 16 will flow through the electromagnetic coil L2. When the current exceeds a tripping current threshold of the electromagnetic coil L2, the electromagnetic coil L2 will drive the mechanical switch to trip. The entire tripping process of the mechanical switch is not affected by the control unit 110 and other circuits. The theoretical maximum tripping time depends only on the size of the electromagnetic coil L2 and the mechanical delay, so the entire tripping time can be significantly reduced, for example, within 10 ms.

A flowchart of a process 400 for protecting a solid-state circuit breaker is described below with reference to FIG. 4. The process 400 may be performed by the protection apparatus described above, for example by the control unit 10 in the protection apparatus.

At block 410, the control unit 10 receives a case temperature of one or more transient voltage suppressors 110 from the temperature detection unit 12. The temperature detection unit 12 may be configured as described above for detecting the case temperature of each transient voltage suppressor 110.

At block 420, for each transient voltage suppressor 110, the control unit 10 predicts the junction temperature of each transient voltage suppressor 110 after the first switching device Q1 and the second switching device Q2 are switched from the on state to the off state based on the case temperature before the first switching device Q1 and the second switching device Q2 are switched from the on state to the off state. The control unit 10 may predict the junction temperature by using the approaches described above.

At block 430, the control unit 10 generates a first alarm signal in response to the junction temperature of at least one transient voltage suppressor 110 among the one or more transient voltage suppressors 110 exceeding a predetermined temperature threshold.

In some embodiments, the junction temperature of one or more transient voltage suppressors 110 is determined by an equation:

$$Tj = Tcase + \text{delta\_Tcase} * K + Terr,$$

where Tj represents the junction temperature of each transient voltage suppressor 110 predicted before the first switching device Q1 and the second switching device Q2 are switched from the on state to the off state, Tcase represents the case temperature of each transient voltage suppressor 110 before the first switching device Q1 and the second switching device Q2 are switched from the on state to the off state, delta_Tcase represents the average value of the temperature rise of the case temperature of each transient voltage suppressor 110 in a case that the first switching device Q1 and the second switching device Q2 are switched off normally for multiple times (i.e., the reference case temperature rise mentioned above), K represents a conversion coefficient, and Terr is a predetermined temperature conversion error. Terr can be set according to design requirements, for example, 10° C.

In some embodiments, the process 400 further includes: recording the number of times that an instantaneous temperature rise occurs in the case temperature; and in response to the number of times of the instantaneous temperature rise reaching a predetermined number of times, generating a second alarm signal.

In some embodiments, the process 400 further includes: receiving a current of first transient voltage suppression unit 11 from the current detection unit 15; receiving an input voltage of first transient voltage suppression unit 11 from the input voltage detection unit 13; receiving an output voltage of first transient voltage suppression unit 11 from the output voltage detection unit 14; determining a voltage across the first transient voltage suppression unit 11 based on the input voltage and the output voltage; determining whether the first transient voltage suppression unit 11 operates in the normal state based on the current of the first transient voltage suppression unit 11 and the voltage across the first transient voltage suppression unit 11; and in response to the first transient voltage suppression unit 11 not operating in the normal state, generating a third alarm signal.

In some embodiments, determining whether the first transient voltage suppression unit 11 operates in the normal state based on the current of the first transient voltage suppression unit 11 and the voltage across the first transient voltage suppression unit 11 comprises: determining whether the first transient voltage suppression unit 11 touches at least one of the safe operation area curve, the temperature derating curve, the maximum single pulse power and the maximum clamping voltage; in response to the first transient voltage suppression unit 11 not touching at least one of the safe operation area curve, the temperature derating curve, the maximum single pulse power and the maximum clamping voltage, determining that the first transient voltage suppression unit 11 operates in the normal state; and in response to the first transient voltage suppression unit 11 touching at least one of the safe operation area curve, the temperature derating curve, the maximum single pulse power and the maximum clamping voltage, determining that the first transient voltage suppression unit 11 does not operate in the normal state.

FIG. 5 shows a block diagram illustrating an electronic device 500 in which one or more embodiments of the present disclosure may be implemented. It should be understood that the electronic device 500 shown in FIG. 5 is merely exemplary and should not constitute any limitation on the functionality and scope of the embodiments described herein.

As shown in FIG. 5, the electronic device 500 is in the form of a general purpose electronic device. Components of the electronic device 500 may include, but are not limited to, one or more processors or processing units 510, a memory 520, a storage device 530, one or more communication units 540, one or more input devices 550, and one or more output devices 560. The processing unit 510 may be an actual or virtual processor and is capable of performing various processing according to programs stored in the memory 520. In a multiprocessor system, multiple processing units execute computer-executable instructions in parallel to improve the parallel processing capability of the electronic device 500.

The electronic device 500 typically includes multiple computer storage media. Such media can be any obtainable media accessible to the electronic device 500, including but not limited to volatile and nonvolatile media, removable and non-removable media. The memory 520 can be a volatile memory (such as a register, a cache, a random access memory (RAM)), a nonvolatile memory (such as a read-only memory (ROM), an electrically erasable programmable read-only memory (EEPROM), a flash memory), or some combination thereof. The storage device 530 can be removable or non-removable media, and can include machine-readable media such as a flash drive, a disk, or any other media that can be used to store information and/or data (such as training data for training) and can be accessed within the electronic device 500.

The electronic device 500 may further include additional removable/non-removable, volatile/non-volatile storage media. Although not shown in FIG. 5, a disk drive for reading or writing from removable, non-volatile disks (e.g., "floppy disks") and an optical disk drive for reading or writing from removable, non-volatile optical discs may be provided. In these cases, each drive may be connected to a bus (not shown) by one or more data media interfaces. The memory 520 may include a computer program product 525 having one or more program modules configured to perform various methods or acts of various embodiments of the present disclosure.

The communication unit 540 enables communication with other electronic devices through the communication media. Additionally, the functions of the components of the electronic device 500 may be implemented in a single computing cluster or multiple computing machines that are capable of communicating through a communication connection. Therefore, the electronic device 500 may operate in a networked environment using a logical connection with one or more other servers, a network personal computer (PC), or another network node.

The input device 550 can be one or more input devices, such as a mouse, keyboard, trackball, etc. The output device 560 can be one or more output devices, such as a display, speaker, printer, etc. The electronic device 500 can also communicate with one or more external devices (not shown) through the communication unit 540 as needed, such as storage devices, display devices, etc., communicate with one or more devices that enable users to interact with electronic device 500, or communicate with any device (such as a network interface card, modem, etc.) that enables electronic device 500 to communicate with one or more other electronic devices. Such communication can be performed via input/output (I/O) interfaces (not shown).

According to an exemplary implementation of the present disclosure, there is provided an apparatus for protecting a solid-state circuit breaker. The apparatus includes at least one processing unit and at least one memory. The at least one memory is coupled to the at least one processing unit and stores instructions for execution by the at least one processing unit, which cause the apparatus to perform the method described above when executed by the at least one processing unit.

According to an exemplary implementation of the present disclosure, there is provided a computer-readable storage medium having computer-executable instructions stored thereon, wherein the computer-executable instructions are executed by a processor to implement the methods described above. According to an exemplary implementation of the present disclosure, there is also provided a computer program product, which is tangibly stored on a non-transient computer-readable medium and includes computer-executable instructions executed by a processor to implement the method described above.

Various aspects of the present disclosure are described herein with reference to flowcharts and/or block diagrams of methods, apparatus, devices, and computer program products implemented in accordance with the present disclosure. It should be understood that each block of the flowcharts and/or block diagrams and combinations of blocks in the flowcharts and/or block diagrams can be implemented by computer-readable program instructions.

These computer-readable program instructions can be provided to a processing unit of a general-purpose computer, a special-purpose computer, or other programmable data processing device to produce a machine, such that these instructions, when executed by a processing unit of a computer or other programmable data processing device, produces a device that implements the functions/actions specified in one or more blocks in the flowchart and/or block diagram. These computer-readable program instructions can also be stored in a computer-readable storage medium, which causes the computer, programmable data processing device, and/or other device to operate in a specific manner. Therefore, the computer-readable medium storing the instructions includes an article of manufacture that includes instructions for implementing various aspects of the functions/actions specified in one or more blocks in the flowchart and/or block diagram.

Computer-readable program instructions can be loaded onto a computer, other programmable data processing device, or other device to cause a series of operational steps to be performed on the computer, other programmable data processing device, or other device to produce a computer-implemented process, so that the instructions executed on the computer, other programmable data processing device, or other device implement the functions/actions specified in one or more blocks in the flowchart and/or block diagram.

The flowcharts and block diagrams in the attached figures show the possible architecture, functions, and operations of the systems, methods, and computer program products implemented according to the present disclosure. In this regard, each block in the flowcharts or block diagrams can represent a module, program segment, or part of an instruction, which contains one or more executable instructions for implementing the specified logical functions. In some alternative implementations, the functions marked in the blocks can also occur in a different order than those marked in the figures. For example, two consecutive blocks can actually be executed in substantially parallel, and they can sometimes be executed in the opposite order, depending on the functions involved. It should also be noted that each block in the diagrams and/or flowcharts, as well as combinations of blocks in the diagrams and/or flowcharts, can be implemented using dedicated hardware-based systems that perform the specified functions or actions, or can be implemented using a combination of dedicated hardware and computer instructions.

Various implementations of the present disclosure have been described above. The above description is exemplary, not exhaustive, and is not limited to the various implementations disclosed. Without departing from the scope and spirit of the various implementations described, many modifications and changes are obvious to ordinary technicians in the art. The choice of terms used herein is intended to best explain the principles, practical applications, or improvements to the technology in the market, or to enable other ordinary technicians in the art to understand the various implementations disclosed herein.

The invention claimed is:

1. An apparatus for protecting a solid-state circuit breaker, the solid-state circuit breaker comprising a first switching device, a second switching device, and a first transient voltage suppression unit, the first switching device being connected in series with the second switching device, both the first switching device and the second switching device being connected in parallel with the first transient voltage suppression unit, the first transient voltage suppression unit comprising one or more transient voltage suppressors, the apparatus comprising:

a temperature detection unit configured to detect a case temperature of each of the one or more transient voltage suppressors; and a control unit configured to:

receive the case temperature of the one or more transient voltage suppressors from the temperature detection unit;

for each of the one or more transient voltage suppressors, predict a junction temperature of each of the one or more transient voltage suppressors after the first switching device and the second switching device are switched from an on state to an off state, based on the case temperature before the first switching device and the second switching device are switched from the on state to the off state; and in response to the junction temperature of at least one transient voltage suppressor of the one or more transient voltage suppressors exceeding a predetermined temperature threshold, generate a first alarm signal.

2. The apparatus of claim 1, wherein the temperature detection unit comprises one or more temperature sensors each fixed to a case surface of a respective transient voltage suppressor of the one or more transient voltage suppressors by at least one of a plastic embedment, a metal foil and a heat-resistant adhesive.

3. The apparatus of claim 1, wherein the junction temperature of the one or more transient voltage suppressors is determined by an equation:

$$Tj = Tcase + delta\_Tcase * K + Terr,$$

wherein Tj represents the junction temperature of each transient voltage suppressor predicted before the first switching device and the second switching device are switched from the on state to the off state, Tcase represents the case temperature of each transient voltage suppressor of the one or more transient voltage suppressors before the first switching device and the second switching device are switched from the on state to the off state, delta_Tcase represents an average value of a temperature rise of the case temperature of each transient voltage suppressor in a case that the first switching device and the second switching device are switched off normally for multiple times, K represents a conversion coefficient, and Terr is a predetermined temperature conversion error.

4. The apparatus of claim 1, wherein the control unit is further configured to:

record a number of times that an instantaneous temperature rise occurs in the case temperature; and in response to the number of times of the instantaneous temperature rise reaching a predetermined number of times, generate a second alarm signal.

5. The apparatus of claim 1, further comprising:

a current detection unit connected to the control unit and configured to detect a current of the first transient voltage suppression unit;

an input voltage detection unit connected to the control unit and configured to detect an input voltage of the first transient voltage suppression unit; and an output voltage detection unit connected to the control unit and configured to detect an output voltage of the first transient voltage suppression unit, and wherein the control unit is further configured to:

determine a voltage across the first transient voltage suppression unit based on the input voltage and the output voltage;

determine whether the first transient voltage suppression unit operates in a normal state based on the current of the first transient voltage suppression unit and the voltage across the first transient voltage suppression unit; and in response to the first transient voltage suppression unit not operating in the normal state, generate a third alarm signal.

6. The apparatus of claim 5, wherein determining whether the first transient voltage suppression unit operates in a normal state based on the current of the first transient voltage suppression unit and the voltage across the first transient voltage suppression unit comprises:

determining whether the first transient voltage suppression unit touches at least one of a safe operation area curve, a temperature derating curve, a maximum single pulse power and a maximum clamping voltage;

in response to the first transient voltage suppression unit not touching at least one of the safe operation area curve, the temperature derating curve, the maximum single pulse power and the maximum clamping voltage, determining that the first transient voltage suppression unit operates in the normal state; and in response to the first transient voltage suppression unit touching at least one of the safe operation area curve, the temperature derating curve, the maximum single pulse power and the maximum clamping voltage, determining that the first transient voltage suppression unit does not operate in the normal state.

7. The apparatus of claim 1, further comprising:

a fuse and a second transient voltage suppression unit, connected in series with an electromagnetic coil for tripping a mechanical switch, the second transient voltage suppression unit being configured to be switched on in a case that a voltage across the second transient voltage suppression unit exceeds a first predetermined voltage threshold, and to be switched on and cause the electromagnetic coil to trip the mechanical switch in a case that the voltage across the second transient voltage suppression unit exceeds a second predetermined voltage threshold.

8. A method for protecting a solid-state circuit breaker, the solid-state circuit breaker comprising a first switching device, a second switching device, and a first transient voltage suppression unit, the first switching device being connected in series with the second switching device, both the first switching device and the second switching device being connected in parallel with the first transient voltage suppression unit, the first transient voltage suppression unit comprising one or more transient voltage suppressors, the method comprising:

receiving a case temperature of the one or more transient voltage suppressors from a temperature detection unit configured to detect the case temperature of each of the one or more transient voltage suppressors;

for each of the one or more transient voltage suppressors, predicting a junction temperature of each of the one or more transient voltage suppressors after the first switching device and the second switching device are switched from an on state to an off state, based on the case temperature before the first switching device and the second switching device are switched from the on state to the off state; and in response to the junction temperature of at least one transient voltage suppressor of the one or more transient voltage suppressors exceeding a predetermined temperature threshold, generating a first alarm signal.

9. The method of claim 8, wherein the junction temperature of the one or more transient voltage suppressors is determined by an equation:

$$Tj = Tcase + \text{delta\_Tcase} * K + Terr,$$

wherein Tj represents the junction temperature of each transient voltage suppressor predicted before the first switching device and the second switching device are switched from the on state to the off state, Tcase represents the case temperature of each transient voltage suppressor of the one or more transient voltage suppressors before the first switching device and the second switching device are switched from the on state to the off state, delta\_Tcase represents an average value of a temperature rise of the case temperature of each transient voltage suppressor in a case that the first switching device and the second switching device are switched off normally for multiple times, K represents a conversion coefficient, and Terr is a predetermined temperature conversion error.

10. The method of claim 8, further comprising:

recording a number of times that an instantaneous temperature rise occurs in the case temperature; and in response to the number of times of the instantaneous temperature rise reaching a predetermined number of times, generating a second alarm signal.

11. The method of claim 8, further comprising:

receiving a current of the first transient voltage suppression unit from a current detection unit;

receiving an input voltage of the first transient voltage suppression unit from an input voltage detection unit;

receiving an output voltage of the first transient voltage suppression unit from an output voltage detection unit;

determining a voltage across the first transient voltage suppression unit based on the input voltage and the output voltage;

determining whether the first transient voltage suppression unit operates in a normal state based on the current of the first transient voltage suppression unit and the voltage across the first transient voltage suppression unit; and in response to the first transient voltage suppression unit not operating in the normal state, generating a third alarm signal.

12. The method of claim 11, wherein determining whether the first transient voltage suppression unit operates in a normal state based on the current of the first transient voltage suppression unit and the voltage across the first transient voltage suppression unit comprises:

determining whether the first transient voltage suppression unit touches at least one of a safe operation area curve, a temperature derating curve, a maximum single pulse power and a maximum clamping voltage;

in response to the first transient voltage suppression unit not touching at least one of the safe operation area curve, the temperature derating curve, the maximum single pulse power and the maximum clamping voltage, determining that the first transient voltage suppression unit operates in the normal state; and in response to the first transient voltage suppression unit touching at least one of the safe operation area curve, the temperature derating curve, the maximum single pulse power and the maximum clamping voltage, determining that the first transient voltage suppression unit does not operate in the normal state.

13. A solid-state circuit breaker comprising:

a first switching device, a second switching device, and a first transient voltage suppression unit, the first switching device being connected in series with the second switching device, both the first switching device and the second switching device being connected in parallel with the first transient voltage suppression unit, the first transient voltage suppression unit comprising one or more transient voltage suppressors; and an apparatus for protecting a solid-state circuit breaker, the apparatus comprising:

a temperature detection unit configured to detect a case temperature of each of the one or more transient voltage suppressors; and a control unit configured to:

receive the case temperature of the one or more transient voltage suppressors from the temperature detection unit;

for each of the one or more transient voltage suppressors, predict a junction temperature of each of the one or more transient voltage suppressors after the first switching device and the second switching device are switched from an on state to an off state, based on the case temperature before the first switching device and the second switching device are switched from the on state to the off state; and in response to the junction temperature of at least one transient voltage suppressor of the one or more transient voltage suppressors exceeding a predetermined temperature threshold, generate a first alarm signal.

14. A computer readable storage medium having a computer program stored thereon, the computer program being executable by a processor to implement a method for protecting a solid-state circuit breaker, the solid-state circuit breaker comprising a first switching device, a second switching device, and a first transient voltage suppression unit, the first switching device being connected in series with the second switching device, both the first switching device and the second switching device being connected in parallel with the first transient voltage suppression unit, the first transient voltage suppression unit comprising one or more transient voltage suppressors, the method comprising:

receiving a case temperature of the one or more transient voltage suppressors from a temperature detection unit configured to detect the case temperature of each of the one or more transient voltage suppressors;

for each of the one or more transient voltage suppressors, predict a junction temperature of each of the one or more transient voltage suppressors after the first switching device and the second switching device are switched from an on state to an off state, based on the case temperature before the first switching device and the second switching device are switched from the on state to the off state; and in response to the junction temperature of at least one transient voltage suppressor of the one or more transient voltage suppressors exceeding a predetermined temperature threshold, generate a first alarm signal.

* * * * *